United States Patent [19]

Piteo et al.

[11] Patent Number: 4,924,831
[45] Date of Patent: May 15, 1990

[54] CAPACITOR DISCHARGE IGNITION SYSTEM WITH MICROPROCESSOR TIMING CONTROL

[75] Inventors: Michael J. Piteo, Enfield, Conn.; Real L. Mercier, W. Springfield, Mass.

[73] Assignee: R. E. Phelon Company, Inc., East Longmeadow, Mass.

[21] Appl. No.: 377,125

[22] Filed: Jul. 10, 1989

[51] Int. Cl.$^5$ .............................................. F02P 5/00
[52] U.S. Cl. .................................. 123/417; 123/416; 123/602
[58] Field of Search ................ 123/417, 416, 596, 599, 123/600, 602

[56] References Cited

U.S. PATENT DOCUMENTS

| | | | |
|---|---|---|---|
| 4,480,615 | 11/1984 | Takasu et al. | 123/416 |
| 4,537,174 | 8/1985 | Nagasawa | 123/599 |
| 4,707,791 | 11/1987 | Hinelovsky et al. | 123/416 |
| 4,722,311 | 2/1988 | Erbard | 123/602 |
| 4,762,106 | 8/1988 | Blauhut | 123/416 |
| 4,777,919 | 10/1988 | Kanno et al. | 123/416 |
| 4,841,932 | 6/1989 | Hanson et al. | 123/416 |

Primary Examiner—Raymond A. Nelli
Attorney, Agent, or Firm—Chapin, Neal & Dempsey

[57] ABSTRACT

Capacitor charge ignition system includes a computer chip programmed to control ignition timing of the system. The system has a generator coil and primary and secondary windings of an ignition coil disposed on one leg portion of a ferromagnetic core. The generator coil is wound with respect to ground potential to provide positive pulses, one preceding and one following, in sequence, an intermediate pulse of negative polarity induced in the generator coil in response to rotation of permanent magnet poles past the one core leg. The positive pulses are supplied to a microprocessor which is programmed to determine the elapsed time between the pair of positive pulses and to provide an output signal which is a multiple function of the elapsed time. A capacitor is charged by the intermediate pulse so that its grounded side is changed to a positive polarity voltage which is connected in circuit with the primary winding of the ignition coil and with the anode/cathode path of a silicon controlled rectifier (SCR). An optocoupler switch is connected to the output signal of the microprocessor, to the control electrode of the SCR and to the capacitor. A minor portion of the positive voltage charge on the capacitor is used to trigger the SCR to its conductive state based on the output generated by the microprocessor. The capacitor is connected to discharge the remainder of its positive charge through the primary winding and the SCR to generate an ignition pulse in the secondary winding of the ignition coil.

10 Claims, 2 Drawing Sheets

CAPACITOR DISCHARGE IGNITION SYSTEM WITH MICROPROCESSOR TIMING CONTROL

BACKGROUND OF THE INVENTION

This invention relates to ignition systems for small engine applications and, more particularly, to capacitor discharge ignition systems in which a microprocessor is provided to control the ignition timing of the system.

The ignition system of this invention is particularly adapted for small single cylinder internal combustion engines of the type commonly used for powering lawn mowers, chain saws, snow blowers, string trimmers and the like. It should, however, be understood that the invention is not necessarily limited to such application.

A capacitor discharge ignition or "CDI" system in the prior art of the type to which this invention would be applicable is disclosed in U.S. Pat. No. Re. 31,837 to Burson, assigned to the same assignee as this application.

U.S. Pat. No. 4,378,769 discloses the use of a microprocessor for digital control of an inductive type ignition system in which a transistor allows ignition current to flow through the primary winding of an ignition coil. When the current flow in the primary winding is interrupted, its collapse generates the ignition pulse in the secondary.

U.S. Pat. No. 4,515,118 also discloses a magneto ignition system of the inductive type.

The following U.S. patents disclose various magneto ignition systems controlled by microprocessors: U.S. Pat. Nos. 4,553,517; 4,570,595; 4,633,832; 4,653,189 and 4,656,985. These patents relate to inductive type ignition systems and employ reference pulses for the start and stop of the timer measuring function. In each of these patents, the reference pulses are generated in the ignition coil over successive complete revolutions of the rotatable permanent magnet poles of the magneto.

In the present invention, the ignition system is a capacitor discharge ignition system in which the start and stop, or reference, pulses for the time measuring function are both generated over only a portion of one revolution of the magneto.

It is the principal object of this invention to provide a capacitor discharge ignition system with a digital timing control in a system which is simple, economical and highly reliable.

It is another object of this invention to provide a CDI system of the above type wherein the pulses which charge the capacitor and which are used for the measurement of engine speed are all generated during a small part of one revolution of the engine and provide for timing advance at higher rpm.

The above and other objects and advantages of this invention will be more readily apparent from the following description read in conjunction with the accompanying drawings, in which.

DETAILED DESCRIPTION OF THE PREFERRED EMBODIMENTS

Figure 1:
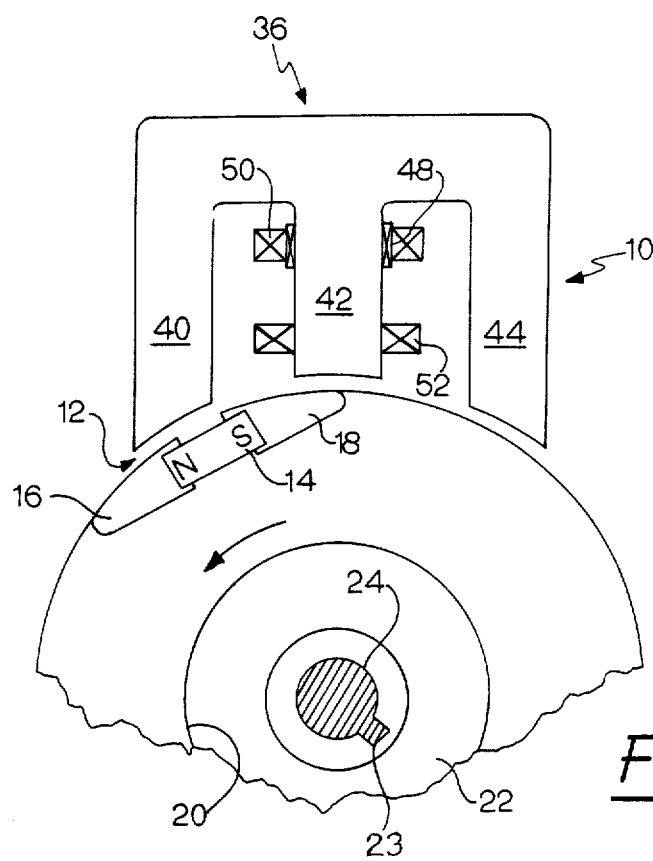
FIG. 1 is a partial elevational view of a magneto motive device of the type embodying this invention.
Figure 3:
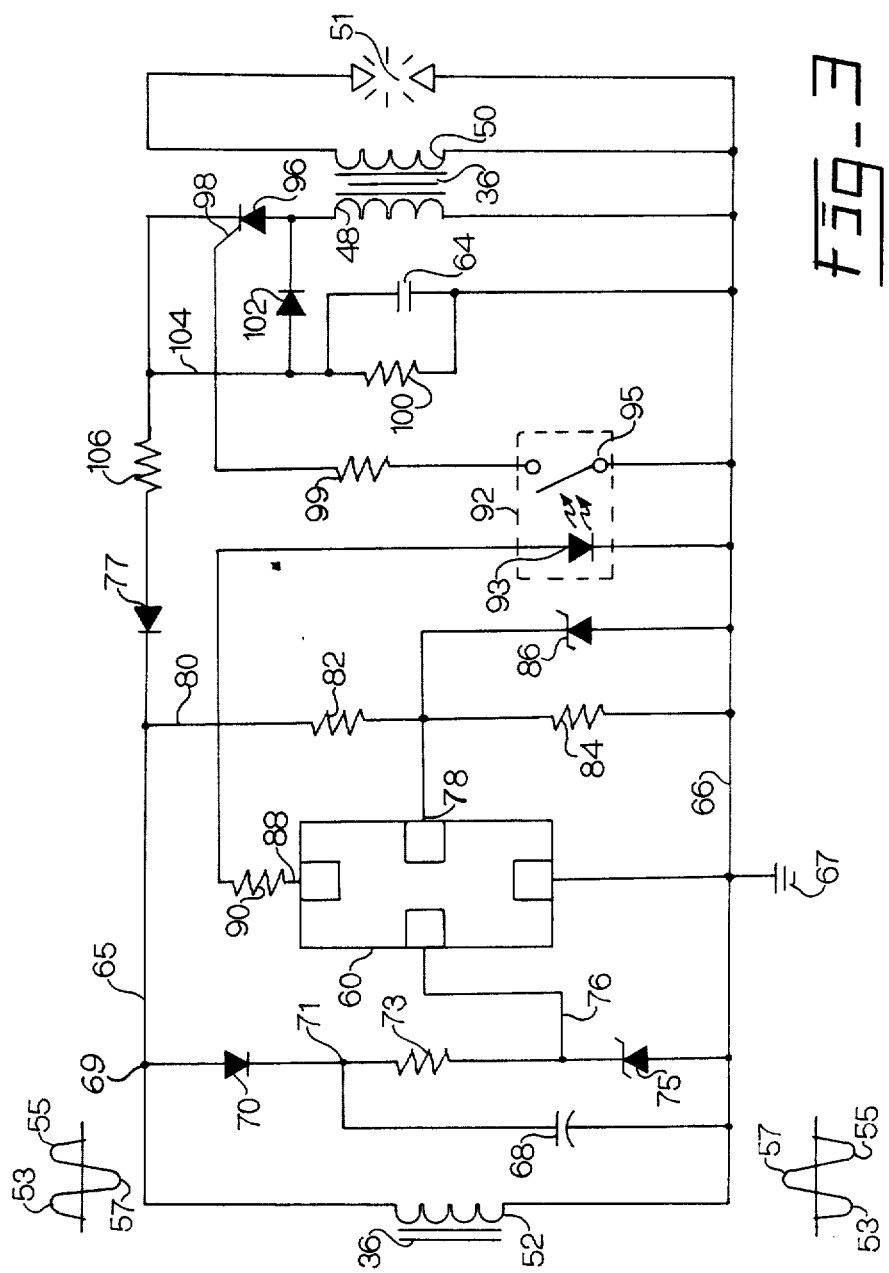
FIG. 3 is a schematic wiring diagram of an ignition system of the type embodying this invention.

Turning to the drawings, and first considering FIG. 1, in which is shown a stator unit 10 and a permanent magnet rotor assembly 12 comprising, except for the electronic circuit of FIG. 3 and an associated spark plug, substantially all of a capacitor discharge ignition, or breakerless system for a single cylinder internal combustion engine.

The permanent magnet assembly 12 is or may be of generally conventional construction consisting of a permanent magnet 14 clamped between two pole pieces 16 and 18. The magnet assembly 12 is cast into the rim 20 of a nonmagnetic flywheel 22 which has a keyway 23 at a predetermined angular position relative to the magnet group whereby the flywheel is fixed to a shaft 24 of an engine for synchronized rotation with the engine shaft 24. As a result, the shaft 24, such as the crankshaft or camshaft, will rotate in synchronism with the operation of the internal combustion engine so that movement of the magnet assembly 12 past a given point of the stator core is timed in physical relation to the top dead center position of the crank-arm driven by a piston of the engine.

The stator unit 10 includes core 36 which is a magnetic flux conducting member, made of laminated iron, in which a changing magnetic flux is created as the magnet assembly moves past the core. As shown, core 36 has three poles 40, 42 and 44 spaced from one another along the circumferential arc of the magnet assembly 12. It will be understood by those skilled in the art that as the magnet assembly 12 moves counterclockwise, as shown, it will magnetically link poles 42 and 44 and then poles 40 and 42 of the core 36. The magnetic flux, in the middle pole 42, will flow first in one direction, and then the opposite direction, in what is known as a "flux reversal" and which, for a given rpm, will induce the maximum voltage in a given coil wound on this pole.

The transformer primary winding 48, secondary winding 50 and a generator or charging winding 52 are mounted on the middle leg of the core. While this invention is described in connection with three leg core applications, it can also be used in two leg core applications.

Figure 2:
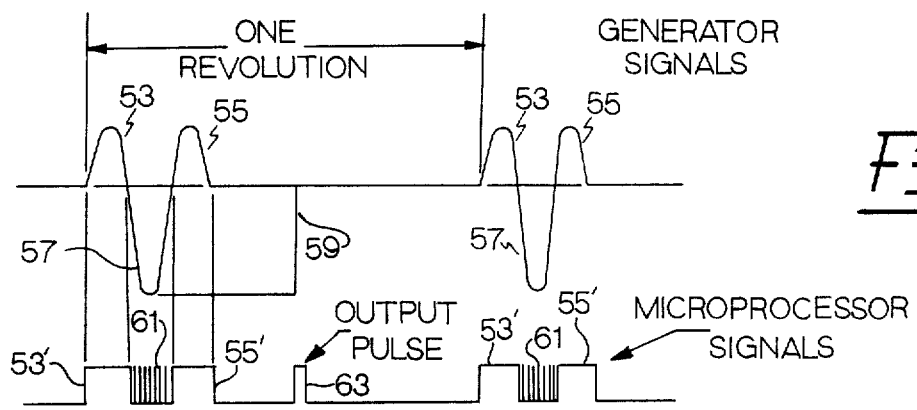
FIG. 2 is a graph illustrating waveforms generated in the ignition stem by the rotation of permanent magnets past the coil/core group of FIG. 1.

In considering the operation of the system, reference may be had to FIG. 2 which shows the wave-forms of the voltages appearing in the charging winding 52 during passage of the magnet assembly 12 past the ferromagnetic core 36. The charge winding is wound so that the leading and trailing pulses 53 and 55 are positive pulses while the intermediate pulse 57, induced by the flux reversal described above, is of negative polarity with respect to ground. The intermediate pulse 57 is the major pulse induced in coil 52, by the flux reversal in pole 42, and is used to charge the grounded side of capacitor 64 (FIG. 3), the discharge of which provides the ignition pulse, as will hereinafter be more fully described. The capacitor 64 will remain charged until discharged, as represented at 59 in FIG. 2, by a signal from a microprocessor 60. The voltage pulses 53, 55 and 57 are generated during a portion of each revolution of the magnet group 12 past the coil/core group of stator 10. Each positive pulse is an input to the microprocessor 60 where a corresponding pulse 53' serves as a start pulse for the timer and pulse 55' serves as a stop pulse. The distance or elapsed time base between pulses 53' and 55', is an analogue representation of the rotational speed or rpm of the flywheel. During this interval, the microprocessor 60 will generate a series of equally spaced digital signals or clock pulses which, although not output signals, are represented at 61 in FIG. 2. The number of clock pulses during the elapsed time interval between pulses 53' and 55' will vary inversely with engine rpm.

To enable completion of the relatively slow charging cycle of capacitor 64 and to enable timing advance at high rpm, it has been found that suitable operation will be achieved by delaying the ignition trigger pulse to a point in time substantially later than the positive-going pulse 55. In some applications, this may be accomplished by modifying the number of clock pulses 61 as by a predetermined factor, such as a multiple, so that a trigger pulse 63 will be generated well after, or substantially later than the occurrence of the second timing pulse 55 following the capacitor charging pulse 57.

By way of example, for up to a given engine speed such as 4000 rpm for a chain saw, the ignition system has fixed timing established by the keyway location 23 of the flywheel 22. The ignition pulse may occur at 32° before top dead center or some other predetermined angle. At higher rpm, a predetermined advance will be called for, such as an 8° advance, or 40° (32°+8°) before top dead center. Up to 4000 rpm, a predetermined number of pulses or such as one hundred (100) will be generated by the microprocessor 60 between the end of first pulse 53 and the beginning of second voltage pulse 55. When the engine speed increases above 4000 rpm, the voltage pulses will be generated closer together and the microprocessor will generate proportionally fewer clock pulses 61, such as, for example, eighty (80) instead of one hundred (100). To obtain the timing advance of 8°, which is $\frac{1}{4}$ of 32°, the microprocessor would be programmed to compute $\frac{1}{4}$ of eighty (80), or a twenty (20) pulse advance, which will be deducted from the eighty (80) pulse reading. This result will be increased by a predetermined factor, such as multiple of two (2) whereby the output will be computed at the one hundred twenty (120) pulse position to provide the microprocessor output signal 63 to trigger the SCR 96 at the sixty (60) pulse position. In this way, a sufficient delay will be provided after the termination of pulse 55, allowing for a timing advance for the capacitor 64 to be discharged to generate an ignition pulse.

Referring now to FIG. 3, a schematic wiring diagram of a CDI system is shown of the type which embodies this invention. The system comprises the charging, or generator coil 52 which provides the input voltage pulses to initiate and control operation of a microprocessor, or computer chip 60 and to charge capacitor 64 for timed discharge through the primary winding 48 of the ignition coil whereby an ignition spark is generated by secondary winding 50 across spark plug 51.

The microprocessor 60 may be any suitable integrated circuit chip, such as timer chip MC68HC05 marketed by the Motorola Company. The microprocessor 60 is connected in circuit with the generator or charging coil 52 by conductors or leads 65 and 66. Lead 65 is connected to junction 69 and lead 66 is connected to ground, as shown at 67. Charging coil 52 and primary coil 48 are connected across conductors 65 and 66 and have a common ground connection. From junction 69, a capacitor 68 is connected in series with diode 70 which is poled to charge the capacitor 68 with a portion of the positive voltage pulses 53 and 55 induced in the charging coil 52, as indicated by the small wave shapes represented adjacent to conductor 65. Junction 69 is also connected to the cathode of blocking diode 77. At the grounded lead, the pulses 53 and 55 will be of opposite polarity, as illustrated adjacent lead 66, with pulses 53 and 55 being shown as negative and intermediate pulse 57, positive from the ground reference with respect to lead 65. It is this intermediate pulse 57 which is used to charge the grounded side of capacitor 64 and, by its timed discharge through the primary coil 48, an ignition pulse will be induced in secondary 50 and to spark plug 51, as will hereinafter be described.

The voltage charge on capacitor 68 provides a direct current power supply to operate microprocessor 60. From junction 71, two circuit branches are connected to grounded lead 66. One branch includes capacitor 68 and the second branch includes current limiting resistor 73 and a voltage regulating Zener diode 75. Lead 76, which extends from the second branch, provides the input voltage to operate the computer chip 60. The blocking diode 77 serves to prevent discharge of the voltage stored on capacitor 64 during generation of the next positive voltage pulse 55 connected to the opposite side of capacitor 64.

The timing function of the chip 60 is responsive to the spacing between positive pulses 53 and 55 which are supplied to terminal 78 by the conductor 80. Resistors 82 and 84 connected to conductor 80 form a voltage divider network. Zener diode 86 is connected across resistor 84 and controls the input voltage to terminal 78. The output signal or pulse 63 from the chip 60, which is calculated by a digital timer or counter, as above described, is connected by lead 88 via resistor 90 to an opto-coupler 92. Opto-coupler 92 comprises an electronic switching component in the form of a light emitting diode (led) 93, which emits an infrared light when conducting current, and a normally "open", light sensing switch 95 connected to control in response to infrared light, the operation of a solid state switching element 96.

The solid state switching element 96 is preferably a silicon controlled rectifier (SCR) having a control electrode or gate 98 connected to switch 95 by current limiting resistor 99. Resistor 99 has sufficient resistance to limit the gate current, to within the millivolt range, needed to trigger "ON" the SCR 96.

Resistor 100 is connected across capacitor 64 and is of sufficient impedance merely to bleed-back excessive voltage from one side of the capacitor 64 to the other side. The diode 102 is connected to provide a ring-back path between the capacitor 64 and the primary coil 48. When the SCR 96, turns "ON", the discharge of capacitor 64 is from the positive, or grounded, side thereof through the primary winding 48, the anode/cathode path of the SCR 96 and conductor 104, back to the opposite, or negative, side of the capacitor 64. When the polarity of capacitor 64 is thereby reversed in polarity so that its initially negative side becomes positive, a ring-back path will be provided from the ungrounded side of capacitor 64, through diode 102 and back through primary coil 48. This "ringing back" may continue for several cycles of polarity reversal and provides for maximum duration and energy of the spark which is thus generated across spark plug 51.

Resistor 106 is connected in series with the anode/cathode path of SCR 96 to prevent excessive current lag at high speed when the microprocessor output is holding switch 95 "closed" and SCR 96 is in its conducting mode. The resistor 106 enables the SCR to remain "ON" at high speed without the danger of losing the timing base between pulses 53 and 55 due to such excessive current lag.

Having thus described my invention, what is claimed is:

1. A capacitor discharge ignition system for an internal combustion engine having a generator coil, an ignition coil including a primary winding and secondary winding with a spark plug connected thereacross said coils being wound about a ferromagnetic core disposed in magnetically coupled relation with a rotating permanent magnet means whereby at least two pulses of one polarity and an intermediate pulse of opposite polarity are sequentially induced in the generator coil during a fractional portion of one revolution of the magnet means, an electronic circuit for said system comprising a microprocessor, means for energizing the microprocessor with a portion of the energy of said pulses, the two pulses of one polarity being supplied to the microprocessor to establish a time base for the computation of equally spaced clock pulses inversely proportional in number to the rotational speed of said engine, a capacitor charged by the intermediate pulse, electronic switch means connected in circuit with the primary winding and including a control electrode responsive to an output signal from the microprocessor to trigger the electronic switch means "ON" based upon the number of clock pulses so that, when switch means is triggered "ON", the voltage charge of said capacitor is discharged through the primary winding and switch means whereby an ignition pulse is induced in the secondary winding to provide an ignition spark across said spark plug.

2. A capacitor discharge ignition system, as set forth in claim 1, in which said electronic switch means comprises a silicon controlled rectifier (SCR) having control electrode and an anode/cathode current path and an opto-coupler having a light emitting diode responsive to an output timing signal from the microprocessor and a light sensing switch connected in circuit with said control electrode of said (SCR).

3. A capacitor discharge ignition system, as set forth in claim 1, in which the two pulses of one polarity are positive and the intermediate pulse is negative, and in which said microprocessor inculdes means for modifying the clock pulses so that the trigger pulse will be generated substantially later than the second occurring pulse of one polarity.

4. A capacitor discharge ignition system, as set forth in claim 1, in which the two pulses of one polarity are positive and the intermediate pulse is negative, and said microprocessor includes means for increasing said clock pulses by a predetermined multiple so that the trigger pulse will be generated substantially later than the second occurring pulse of one polarity.

5. A capacitor discharge ignition system, as set forth in claim 1, in which said core includes a middle leg and two circumferentially spaced outer leg portions and in which the generator coil and ignition coil are wound on said middle leg of said core whereby said pulses are all generated in a portion of one revolution of the magnet means past the core, said intermediate pulse being induced in the generator coil by a flux reversal in said middle leg.

6. A capacitor discharge ignition system, as set forth in claim 2, in which said generator coil is wound with one end thereof connected to the input side of said microprocessor and the other end is connected to ground potential, the polarity of said positive and negative pulses being with reference to said ground potential, said capacitor having a high potential side and a grounded side, said high potential side being connected in series with a blocking diode which is poled to prevent charging of said high potential side by said positive pulses, the grounded side of said capacitor being charged by the intermediate pulse which has a positive-going polarity with reference to said high potential side of the circuit, said primary winding having one end connected to the grounded end of said capacitor and the opposite end connected to the anode of said SCR so that when said SCR is triggered "ON" the capacitor will be discharged through said primary winding and the anode-to-cathode path of said SCR.

7. A capacitor discharge ignition system, as set forth in claim 2, in which said microprocessor is powered by a portion of the energy from said positive pulses and is connected to one circuit comprising a diode, a limiting resistor, a Zener diode and a second capacitor connected across the limiting resistor and Zener diode.

8. A capacitor discharge ignition system, as set forth in claim 6, in which a ring-back path is provided by a diode connected with its anode to the ungrounded side of said capacitor and with its cathode to the high potential side of the primary winding.

9. A capacitor discharge ignition system, as set forth in claim 7, in which other portions of said positive pulses are connected to said microprocessor for the time base computation by means of a voltage divider and a Zener diode.

10. A capacitor discharge ignition system for an internal combustion engine having a generator coil, an ignition coil including a primary winding and secondary winding with a spark plug connected thereacross said coils being wound about a ferromagnetic core disposed in magnetically coupled relation with a rotating permanent magnet means whereby a plurality of pulses of opposite polarity are sequentially induced in the generator coil during a fractional portion of one revolution of the magnet means, an electronic circuit for said system comprising a microprocessor, means for supplying pulses of one polarity to the microprocessor to establish an ignition timing signal inversely proportional to the rotational speed of said engine, which timing signal is delayed by a predetermined factor, a capacitor being charged by at least one of said pulses, electronic switch means connected in circuit with the primary winding and being responsive to an output signal from the microprocessor to trigger the electronic switch means "ON" based upon the delayed timing signal so that when the switch means is triggered "ON", the voltage charge of said capacitor is discharged through the primary winding and the switch means whereby an ignition pulse is induced in the secondary winding to provide an ignition spark across said spark plug.

* * * * *